US009497619B2

(12) United States Patent
Godin

(10) Patent No.: US 9,497,619 B2
(45) Date of Patent: Nov. 15, 2016

(54) SELF-CONFIGURATION OF DONOR/RELAY NODE RELATIONSHIP

(75) Inventor: Philippe Godin, Viroflay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 92 days.

(21) Appl. No.: 13/702,627

(22) PCT Filed: Jun. 8, 2011

(86) PCT No.: PCT/EP2011/059422
§ 371 (c)(1),
(2), (4) Date: Feb. 14, 2013

(87) PCT Pub. No.: WO2011/157600
PCT Pub. Date: Dec. 22, 2011

(65) Prior Publication Data
US 2013/0137434 A1    May 30, 2013

(30) Foreign Application Priority Data
Jun. 16, 2010    (EP) .................................... 10305644

(51) Int. Cl.
H04W 36/00    (2009.01)
H04W 8/24    (2009.01)
H04W 24/02    (2009.01)

(52) U.S. Cl.
CPC ........... *H04W 8/24* (2013.01); *H04W 36/0083* (2013.01); *H04W 24/02* (2013.01)

(58) Field of Classification Search
CPC ................. H04W 36/08; H04W 36/30; H04W 36/18
(Continued)

(56) References Cited

U.S. PATENT DOCUMENTS

2006/0198383 A1    9/2006    Li et al.
2009/0047968 A1*    2/2009    Gunnarsson et al. ........ 455/446
(Continued)

FOREIGN PATENT DOCUMENTS

JP    2006-246460    9/2006
JP    2008-054348    3/2008
(Continued)

OTHER PUBLICATIONS

Mitsubishi Electric, "Mobility management for relays," 3$^{rd}$ Generation Partnership Project (3GPP), 3GPP TSG-RAN WG3 #64, R3-091358, XP050341694, 4 pages, San Francisco, USA, May 4-8, 2009.
(Continued)

*Primary Examiner* — Vladimir Magloire
*Assistant Examiner* — Juan C Perez Tolentino
(74) *Attorney, Agent, or Firm* — Fay Sharpe, LLP

(57) ABSTRACT

The present invention relates to a method for transferring RAN configuration data between radio access nodes. In accordance with an embodiment of the invention, the method comprises the steps of, by a mobility management node (MMEA): receiving a first RAN configuration transfer message (1) issued by a source radio access node (eNBA) operating a source cell (A), comprising a target node identifier (RN-IDB) of a target relay node (RNB) operating a target cell (B) and a target tracking area identifier (TAIB) of the target cell, and whereby the source radio access node requests RAN configuration data from the target relay node; decoding the target node identifier and the target tracking area identifier; and in the event of the target tracking area identifier being managed by the mobility management node and the target node identifier being not associated with any registered radio access node, broadcasting said first RAN configuration transfer message towards a plurality of regis-
(Continued)

tered radio access nodes (DeNBC, eNBD) associated with the target tracking area identifier. The present invention also relates to a management mobility node.

6 Claims, 4 Drawing Sheets

(58) Field of Classification Search
USPC .......... 455/432.1–433, 435–435.3, 436–444; 370/331–333
See application file for complete search history.

(56) References Cited

U.S. PATENT DOCUMENTS

| | | |
|---|---|---|
| 2009/0119751 A1 | 5/2009 | Koga |
| 2009/0247159 A1 | 10/2009 | Flore et al. |
| 2009/0316629 A1* | 12/2009 | Singh et al. ............... 370/328 |
| 2010/0151864 A1 | 6/2010 | Mori |
| 2011/0096687 A1* | 4/2011 | Dottling ............... H04W 24/02 370/252 |

FOREIGN PATENT DOCUMENTS

| | | |
|---|---|---|
| JP | 2008-278264 | 11/2008 |
| WO | WO 2008/004279 | 1/2008 |
| WO | WO 2009/120127 A1 * 10/2009 ............ H04W 24/02 |

OTHER PUBLICATIONS

Ericsson et al., "TP to internal TR on relay architecture options," $3^{rd}$ Generation Partnership Project (3GPP), 3GPP TSG-RAN WG2 #67, XP050389789, pp. 1-15, Shenzhen, China, Aug. 24-28, 2009.
International Search Report for PCT/EP2011/059422 dated Sep. 16, 2011.
Huwai, "Problems of UE handover in the relaying network", R3-101412, 3GPP TSG RAN WG3 #68, Montreal, Canada, May 10-14, 2010.
LG Electronic Inc., "Response to R3-101412", R3-101667, 3GPP TSG RAN WG3 #68, Montreal, Canada, May 10-14, 2010.

* cited by examiner

SELF-CONFIGURATION OF DONOR/RELAY NODE RELATIONSHIP

TECHNICAL FIELD OF THE INVENTION

The present invention relates to cellular Public Land Mobile Network (PLMN), and more specifically to Self Organizing Network (SON) feature, whereby a Radio Access Network (RAN) is self-configured and self-optimized.

TECHNICAL BACKGROUND OF THE INVENTION

Support for self-configuration and self-optimization of Long Term Evolution (LTE) mobile networks is defined in §22 of the Technical Specification (TS) entitled "Evolved Universal Terrestrial Radio Access (E-UTRA) and Evolved Universal Terrestrial Radio Access Network (E-UTRAN); Overall description", published by the 3rd Generation Partnership Project (3GPP) in June 2009, ref. 3GPP TS 36.300 V9.0.0.

Self-configuration process is defined as the process whereby newly deployed evolved-NodeBs (eNB) are configured by automatic installation procedures to get the necessary basic configuration for system operation. This includes network connectivity, eNB authentication and registration to one or more gateway, downloading of eNB software and operational parameters, coverage/capacity related parameter configuration, neighbor list configuration. Self-Configuration process is further defined as the process whereby existing eNBs are automatically updated following the introduction of new eNBs.

Self-optimization process is defined as the process whereby User Equipment (UE) and/or eNB measurements are used to auto-tune the network. This includes neighbor list optimization, and coverage, capacity and handover control.

Automatic Neighbor Relation (ANR) function is an important feature of SON. The purpose of the ANR function is to relieve the operator from the burden of manually managing Neighbor Relations (NR). The ANR function resides in the eNB and manages the conceptual Neighbor Relation Table (NRT). The Neighbor Detection (ND) function finds new neighbors and adds corresponding NRs to the NRT, and the Neighbor Removal (NR) function removes outdated NRs.

A NR in the context of ANR is defined as an association from a source cell towards a target cell. For each cell that the eNB has, the eNB keeps a NRT. For each NR, the NRT contains the Target Cell Identifier (TCI), which identifies the target cell. For E-UTRAN, the TCI corresponds to the E-UTRAN Cell Global Identifier (ECGI) and Physical Cell Identifier (PCI) of the target cell. The NR comprises further attributes, such as whether the NR can be removed from the NRT, or whether there is a direct X2 connection with the eNB operating the target cell.

The ANR function works as follows.

The serving cell eNB has an ANR function. As part of the normal call procedure, the eNB instructs each UE to perform measurements on neighbor cells. The eNB may use different policies for instructing the UE how to perform measurements and when to report them to the serving eNB.

The UE sends a measurement report regarding a particular neighbor cell according to the configured measurement policy. This report contains the neighbor cell's PCI, but not its ECGI.

The eNB instructs the UE, using the newly discovered PCI as parameter, to read the ECGI, i.e. the PLMN Identity and the Cell Identity, and the Tracking Area Identifier (TAI), i.e. the PLMN Identity and the Tracking Area Code (TAC), of the neighbor cell.

When the UE has found out the new cell's ECGI and TAI, the UE reports the detected ECGI and TAI to the serving cell eNB. The eNB decides to add this NR in the NRT of the serving cell, and may use the reported ECGI to lookup a Transport Network Layer (TNL) address, e.g. an Internet Protocol (IP) address, to setup a new X2 connection with the eNB operating the detected neighbor cell.

If the serving eNB has no TNL address suitable for connectivity, then the eNB can utilize the configuration transfer functions to determine the TNL address as follows.

The eNB sends an eNB CONFIGURATION TRANSFER message to the Management Mobility Entity (MME) to request the TNL address of the candidate eNB, and includes relevant information such as the source and target eNB ID.

The MME relays the request by sending an MME CONFIGURATION TRANSFER message to the candidate eNB identified by the target eNB ID.

The candidate eNB responds by sending a further eNB CONFIGURATION TRANSFER message to the initiating eNB containing one or more TNL address to be used for X2 connectivity.

The MME relays the response by sending a further MME CONFIGURATION TRANSFER message to the initiating eNB.

In that RAN configuration data exchange, the MME is transparent, stateless, and do not keep track of the exchanged configuration data.

Release 10 of 3GPP has introduced Relay Nodes (RN) for extending the radio coverage to (mostly rural) areas where backhauling infrastructure are non-existent or deficient. E-UTRAN supports relaying by having an RN wirelessly connect to an eNB serving the RN, called Donor eNB (DeNB), via a modified version of the E-UTRA radio interface, the modified version being called the Un interface.

The RN supports the eNB functionality, meaning it terminates the radio protocols of the E-UTRA radio interface and the S1 and X2 interfaces.

In addition to the eNB functionality, the RN also supports a subset of the UE functionality so as to wirelessly connect to the DeNB.

The DeNB provides S1 and X2 proxy functionality between the RN and other network nodes (i.e., eNBs, MMES and S-GWs). S1 and X2 proxy functionality includes passing S1 and X2 data and control packets between S1 and X2 interfaces associated with the RN and S1 and X2 interfaces associated with other network nodes. Therefore, the DeNB appears to the RN as an MME or an S-GW for S1 interface, or as an eNB for X2 interface.

Handover towards a target cell operated by an RN is expected to work as follows.

In the HANDOVER REQUIRED message, the source eNB includes the TAI of the target cell and the eNB ID of a target DeNB in the Target ID field, and the ECGI of the target cell in the source to target container. The target MME is selected based on the TAI, and routes according to the target ID field. When the target DeNB receives the HANDOVER REQUEST message, it looks at the target ECGI and identifies the target cell as belonging to one of its connected RNs. The target DeNB can then further proxy the HANDOVER REQUEST message to the corresponding RN for further handling thereat.

This algorithm assumes the source eNB knows which DeNB controls the RN. Yet, whenever a UE reports to its serving eNB a newly detected neighbor cell operated by an RN, it will report its PCI, and its ECGI by means of the aforementioned ANR function. The ECGI includes the eNB ID of the RN (further referred to as the RN-ID). However the serving eNB needs the eNB ID of the DeNB (further referred to as the DeNB-ID) that controls that RN in order to build the HANDOVER REQUIRED message. This RN-ID/DeNB-ID mapping information is missing at the serving eNB.

As a consequence, handovers towards RN's cells work at the expense of heavy configuration and high Operational Expenditures (OPEX): whenever an RN is introduced in the network, the operator needs to configure all neighbor eNBs with the identity of the DeNB that controls that RN. This configuration is tedious, scalable with the number of deployed RNs which can be substantial, prone to human mistakes, and all the more tedious that RNs can be nomadic, i.e. can be moved from one place to another after being switched off and then switched on again in a new radio environment.

SUMMARY OF THE INVENTION

It is an object of the present invention to ease network configuration for relay nodes that are radio backhauled and proxied through donor nodes.

In accordance with a first aspect of the invention, a method for transferring RAN configuration data between radio access nodes comprises the steps of, by a mobility management node:
receiving a first RAN configuration transfer message issued by a source radio access node operating a source cell, comprising a target node identifier of a target relay radio access node operating a target cell and a target tracking area identifier of said target cell, and whereby said source radio access node requests RAN configuration data from said target relay radio access node,
decoding said target node identifier and said target tracking area identifier from said first RAN configuration transfer message,
in the event of said target tracking area identifier being managed by said mobility management node and said target node identifier being not associated with any registered radio access node, broadcasting said first RAN configuration transfer message as a further first RAN configuration transfer message towards a plurality of registered radio access nodes associated with said target tracking area identifier.

In accordance with another aspect of the invention, a management mobility node is configured to transfer RAN configuration data between radio access nodes, and comprises:
receiving logic for receiving a first RAN configuration transfer message issued by a source radio access node operating a source cell, comprising a target node identifier of a target relay radio access node operating a target cell and a target tracking area identifier of said target cell, and whereby said source radio access node requests RAN configuration data from said target relay radio access node,
decoding logic for decoding said target node identifier and said target tracking area identifier from said first RAN configuration transfer message,
routing logic for, in the event of said target tracking area identifier being managed by said mobility management node and said target node identifier being not associated with any registered radio access node, broadcasting said first RAN configuration transfer message as a further first RAN configuration transfer message towards a plurality of registered radio access nodes associated with said target tracking area identifier.

In one embodiment of a method according to the invention, and in a corresponding embodiment of a management mobility node according to the invention, a donor radio access node out of said plurality of registered radio access nodes, and through which operation of said target relay radio access node is proxied, returns a donor node identifier of said donor radio access node as part of a second RAN configuration transfer message, which donor node identifier being used as target node identifier of a handover message for handing over a UE from said source cell to said target cell, and said mobility management node forwards said second RAN configuration transfer message as a further second RAN configuration transfer message towards said source radio access node.

In one embodiment of a method according to the invention, and in a corresponding embodiment of a management mobility node according to the invention, a donor radio access node out of said plurality of registered radio access nodes, and through which operation of said target relay radio access node is proxied, returns a network address of said donor radio access node as part of a second RAN configuration transfer message, which network address being used for further connectivity between said source radio access node and said donor radio access node,
and said mobility management node forwards said second RAN configuration transfer message as a further second RAN configuration transfer message towards said source radio access node.

The further first and second RAN configuration transfer messages are not necessarily different from the first and second RAN configuration transfer messages respectively.

The actual problem is how to extend ANR function to automatically configure the knowledge, in every eNB, of which DeNB manages neighbor RNs so as not to configure it manually.

The only routing issue is therefore the routing of the eNB/MME CONFIGURATION TRANSFER messages, and not the one of the HANDOVER REQUIRED/REQUEST messages as one might guess at first glance.

The present invention relies on broadcast/paging of configuration messages over S1 interface as follows.

The source eNB receives the target ECGI and target TAI from the UE ANR report. Within this target ECGI, it can extract the target eNB ID. However, the source eNB doesn't know at this point that the target eNB ID is an RN-ID.

The source eNB includes the target TAI and the target eNB ID (here RN-ID) in an eNB CONFIGURATION TRANSFER message, as of today.

The target MME will not find any match for this eNB ID. Instead of rejecting as of today, the target MME broadcast the eNB CONFIGURATION TRANSFER message as an MME CONFIGURATION TRANSFER message based on the received TAI, i.e. it send multiple copies of the MME CONFIGURATION TRANSFER message to all the eNBs it connects and that pertain to this TAI. This process is not difficult for the MME since it is similar to a paging process for a given UE, The target DeNB will receive the MME CONFIGURATION TRANSFER message as part of all the involved eNBs of this TAI. The other eNBs will discard this message as they do not know about the target eNB ID. The target DeNB will see that the included eNB ID matches the RN-ID of one of the RNs it controls.

The target DeNB will respond on behalf of the target RN with an eNB CONFIGURATION TRANSFER reply including a new field which indicates its DeNB-ID. The target DeNB may also include its X2 transport address as if it was the destination node since it acts as an X2 proxy for the requested target RN.

When the source eNB receives the MME CONFIGURATION TRANSFER reply including the new field, it knows that the requested target node was actually an RN, and it knows the DeNB-ID of the DeNB that controls it. It is ready to do handovers. The source eNB may also receive the X2 transport address, which may be used to set up an X2 connection with the target DeNB.

This invention allows automatic configuration of the DeNB-ID/RN-ID mapping relation in the serving neighboring eNBs which makes handover possible towards RN's cells.

This invention avoids the constraint of manually configuring the DeNB-ID of an RN in each and every neighbor eNB of the RN, and thus substantially decreases the OPEX associated with RNs deployment and operation.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
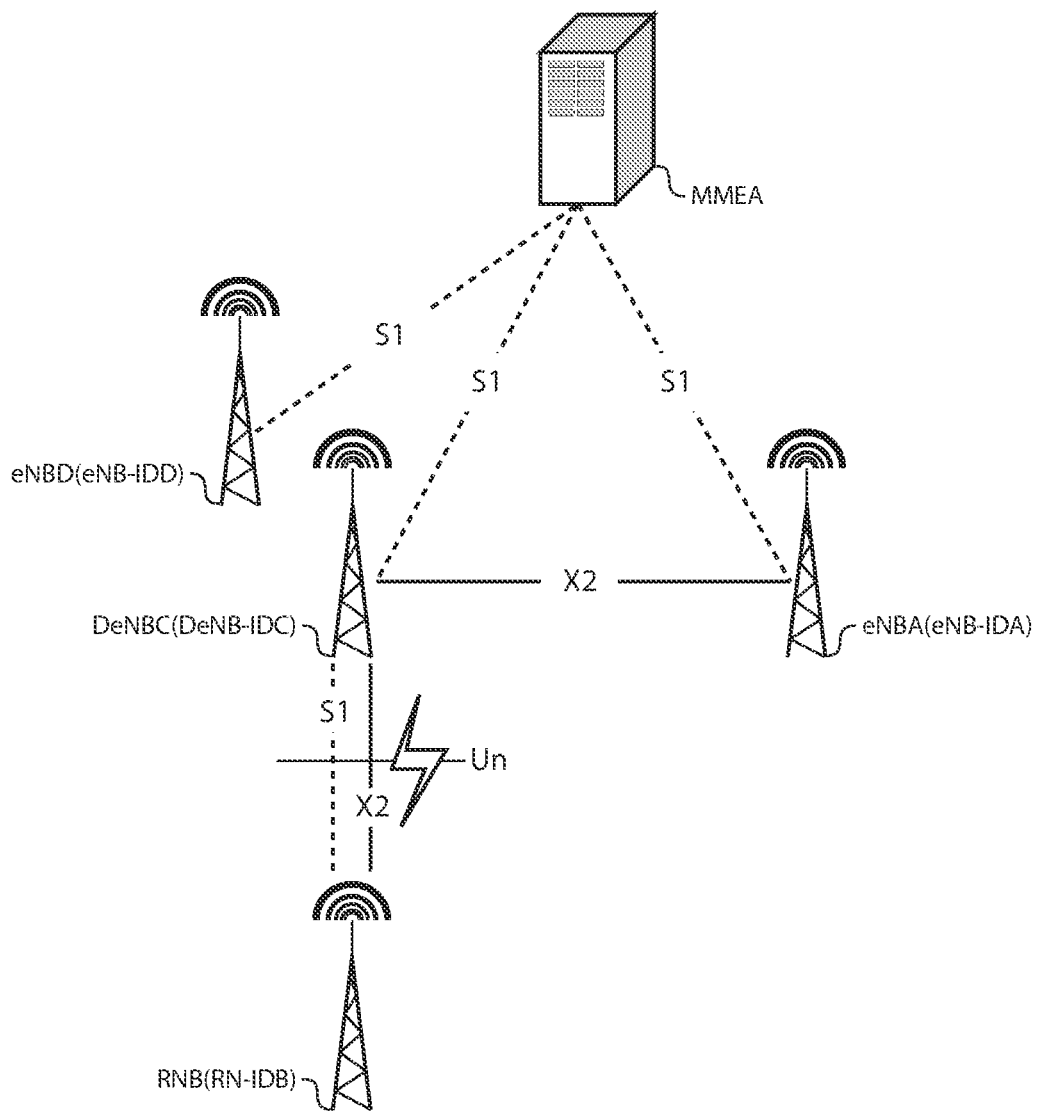
FIG. 1 represents part of an LTE mobile infrastructure.

There is seen in FIG. 1 part of an LTE mobile infrastructure comprising the following network nodes:
an MME MMEA,
4 eNBs eNBA, RNB, DeNBC and eNBD.

The eNBs eNBA, DeNBC and eNBD are directly coupled to the MME MMEA through an S1 interface. The eNB DeNBC is a DeNB that wirelessely connects (via Un interface) the RN RNB to the RAN network. The DeNB DeNBC acts as an S1 proxy for S1 connections between the RN RNB and the MME MMEA, and as an X2 proxy for X2 connections between the RN RNB and further eNBs.

The eNBs eNBA, RNB, DeNBC and eNBD have eNB-IDA, RN-IDB, DeNB-IDC and eNB-IDD as eNB ID.

Figure 2:
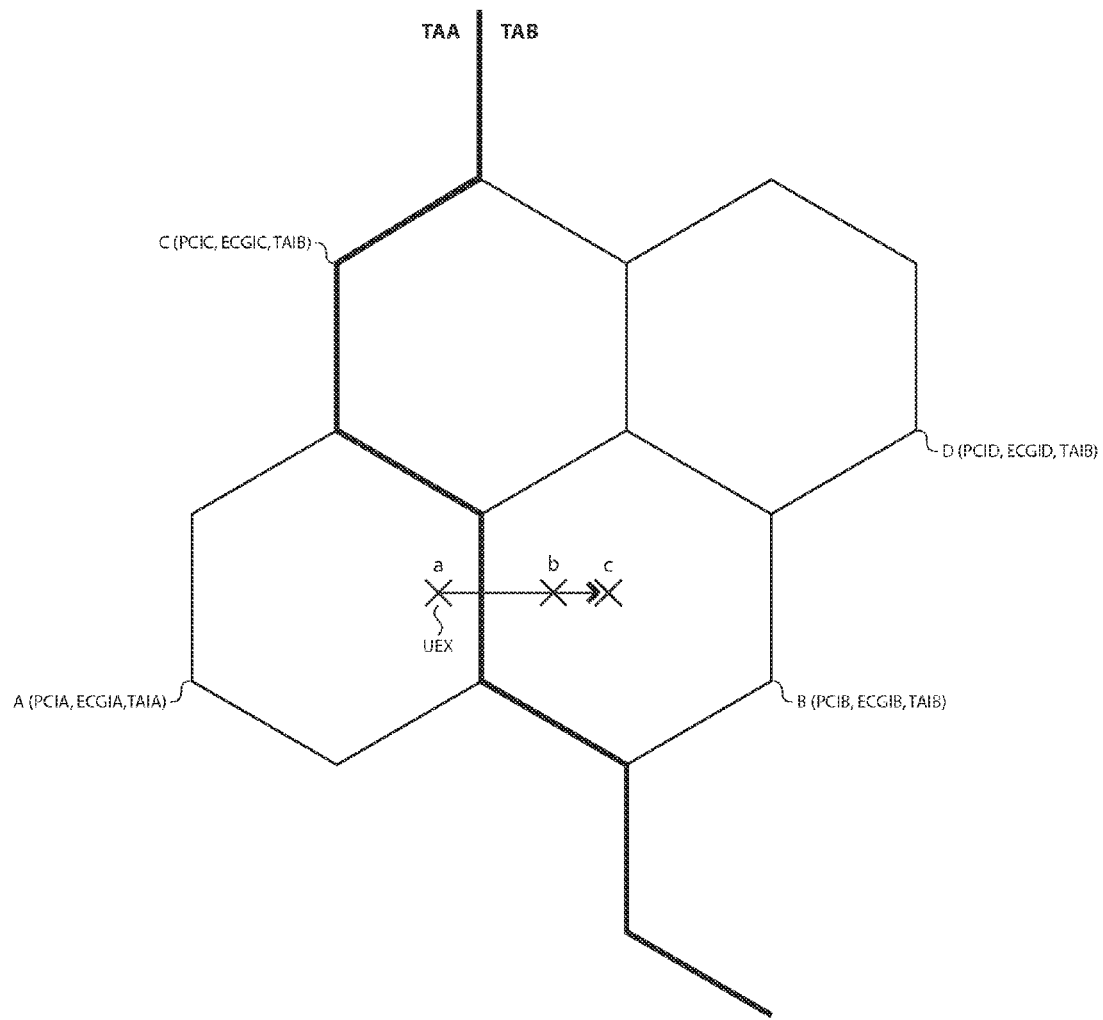
FIG. 2 represents a coverage area.

There is seen in FIG. 2 a radio coverage area of an LTE mobile network comprising 4 cells A, B, C and D.

The first cell A is operated by the eNB eNBA, and belongs to a first tracking area TAA identified by the TAI TAIA. The cell A has PCIA and ECGIA as PCI and ECGI respectively.

The three other cells B, C and D belong to another tracking area TAB identified by the TAI TAIB, and are operated by the eNBs RNB, DeNBC and eNBD respectively. The cell B has PCIB and ECGIB as PCI and ECGI respectively. The cell C has PCIC and ECGIC as PCI and ECGI respectively. The cell D has PCID and ECGID as PCI and ECGI respectively.

A UE UEX, such as a mobile terminal, establishes a communication session at position a, within the coverage area of the cell A, further referred to as the source cell (or serving cell).

The UE UEX next moves towards position c while the communication session is on-going.

At position b, the radio signal from cell B incurs a lower path loss than the radio signal from cell A. Provided the difference between the respective path losses is beyond some configured handover margin, an handover is triggered for handing over the on-going session towards the cell B, further referred to as the target cell. Other handover causes can be invoked too.

Figure 3A:
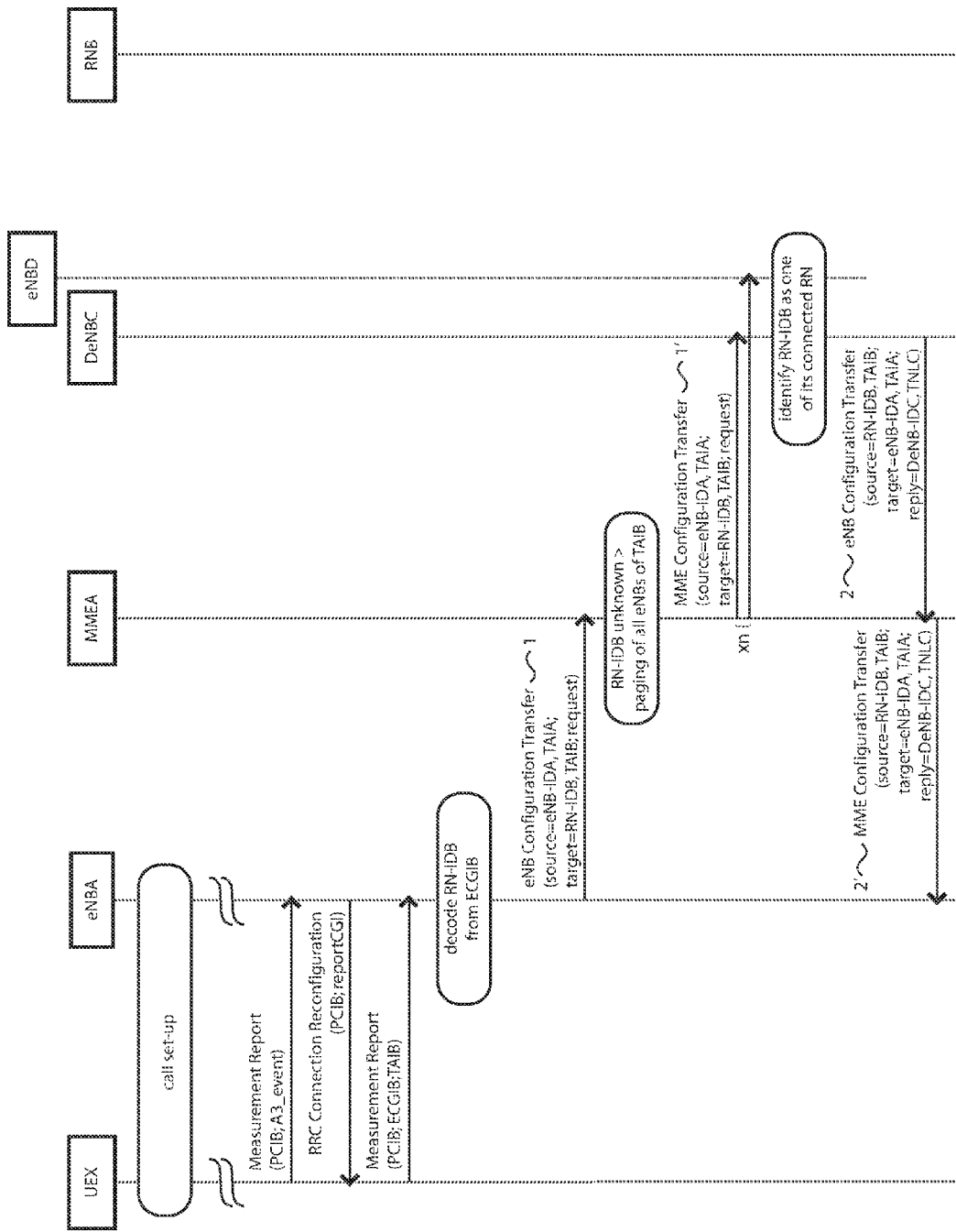
FIGS. 3A and 3B represent a message flow chart.
Figure 3B:
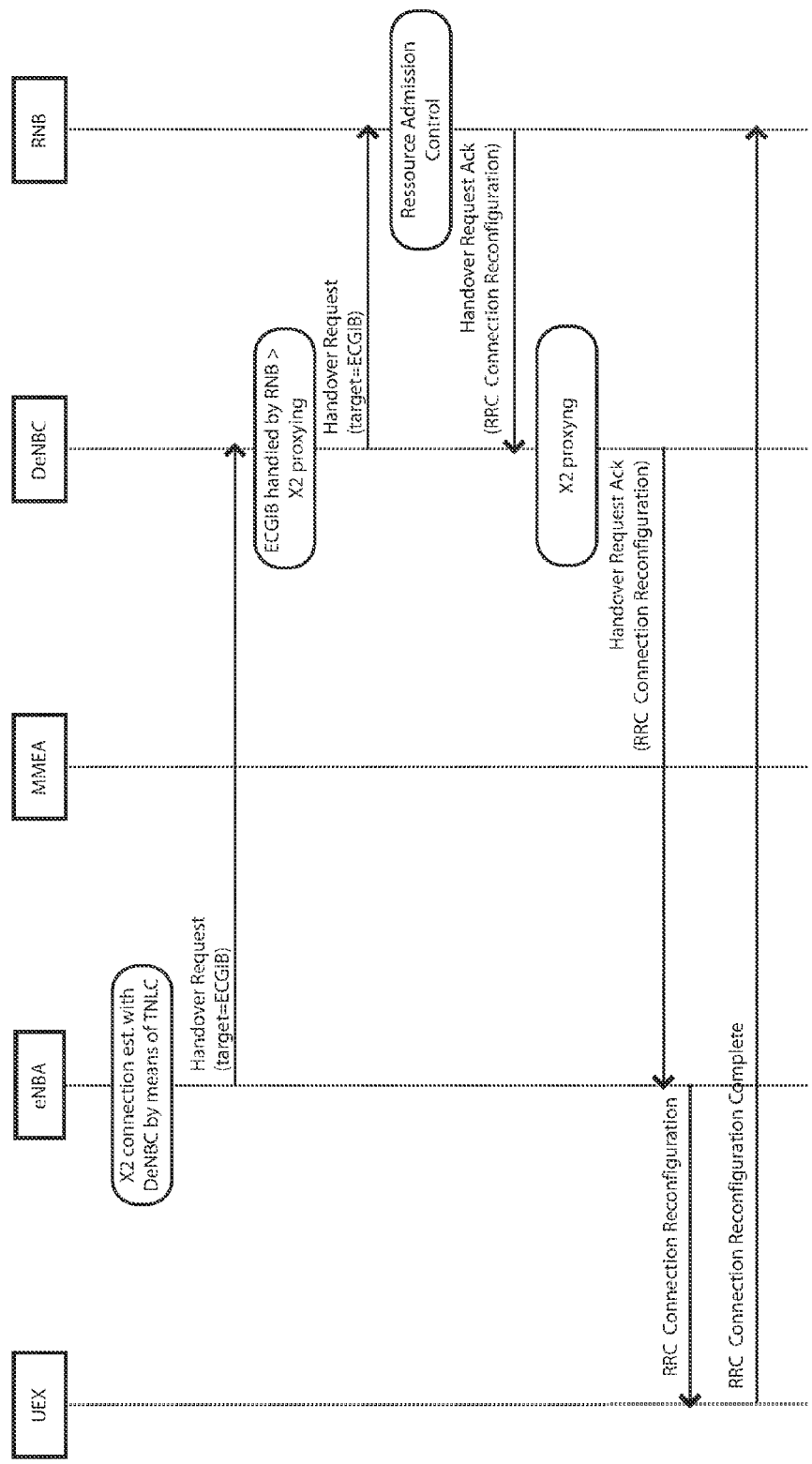

There is seen in FIG. 3A a message flow chart representing the most noticeable messages exchanged during the handover. The message flow chart is continued in FIG. 3B.

First, the UE UEX establishes a communication session within the cell A (see call setup in FIG. 3A).

As part of the call setup procedure, the UE UEX is configured with a measurement policy and handover thresholds. The UE UEX measures the signal strength and quality from neighboring cells, and compares them with the respective handover thresholds.

In a further step, as the UE UEX leaves the cell A operated by the eNB eNBA and enters the cell B operated by the RN RNB, a MEASUREMENT REPORT message is sent to the source eNB eNBA for notifying an handover event towards the target cell B. The MEASUREMENT REPORT message comprises the PCI of the target cell, presently PCIB, and the type of handover event, presently an A3 event (neighbor becomes offset better than serving).

Thereupon, the source eNB eNBA decides to perform a handover for the UE UEX from the source cell A towards the target cell B.

As the PCI PCIB is unknown, the source eNB eNBA requests the UE UEX to read the ECGI and TAI of the neighboring cell B. This is achieved by means of the ANR procedure, and more specifically by sending an RRC CONNECTION RECONFIGURATION message to the UE UEX comprising the PCI of the cell, the ECGI and TAI of which shall be read, and the reportCGI indication.

The UE UEX reads the ECGI ECGIB and the TAI TAIB of the neighbor cell B, and returns them together with the PCI PCIB to the source eNB eNBA by means of a further MEASUREMENT REPORT message.

The ECGI is a combination of the PLMN identity, which is 24 bits long, and the cell identity, which is 28 bits long. The cell identity further comprises the eNB ID encoded over 20 bits, the remaining 8 bits being used for encoding the cell identity within the pertaining eNB.

The source eNB decodes the eNB ID of the target node from the ECGI ECGIB, presently RN-IDB. As this eNB ID is still unknown, the source eNB eNBA sends an eNB CONFIGURATION TRANSFER message to the MME MMEA (see 1 in FIG. 3A). The eNB CONFIGURATION TRANSFER message comprises the source eNB ID and TAI, presently eNB-IDA and TAIA, the target eNB ID and TAI, presently RN-IDB and TAIB, and a request indication.

The MME MMEA checks the target TAI for determining the route the eNB CONFIGURATION TRANSFER message shall follow, and more specifically the next hop this message shall be sent to. Presently, as the MME MMEA manages the target TAI TAIB, this message is not routed further.

The target eNB ID RN-IDB is not known at the MME MMEA, as it corresponds to a RN, and not to a directly connected eNB as are the DeNB DeNBC and the eNB eNBD. Consequently, the MME MMEA broadcast the eNB CONFIGURATION TRANSFER message as an MME CONFIGURATION TRANSFER message towards all the connected eNBs that have cells belonging to the target TAI TAIB, presently towards the DeNB DeNBC and the eNB eNBD (see 1' in FIG. 3A).

The eNB eNBD discards the received MME CONFIGURATION TRANSFER message as its own eNB ID, presently eNB-IDD, does not match the target eNB ID, presently RN-IDB, and as the eNB eNBD is not a DeNB and thus does not control further RNs.

The DeNB DeNBC identifies RN-IDB as the eNB ID of one of its connected RNs, presently RNB, and replies on behalf of the RN RNB by sending a further eNB CONFIGURATION TRANSFER message (see 2 in FIG. 3A). The further eNB CONFIGURATION TRANSFER message comprises RN-IDB and TAIB as source eNB ID and TAI, eNB-IDA and TAIA as target eNB ID and TAI, and a reply indication. This message further comprises, as supplied SON configuration data, the eNB ID of the DeNB DeNBC, presently DeNB-IDC, and possibly the TNL address of the DeNB DeNBC, presently TNLC.

The further eNB CONFIGURATION TRANSFER message is routed as a further MME CONFIGURATION TRANSFER message towards the requesting eNB, presently the eNB eNBA (see 2' in FIG. 3A).

Thereupon, the source eNB eNBA knows that the requested target node is actually an RN, as well as the identity and the TNL address of the DeNB that controls it.

As a first option, the source eNB eNBA establishes an X2 connection with the DeNB DeNBC by means of the supplied TNL address TNLC, and further sends an HANDOVER REQUEST message directly to the DeNB DeNBC. The HANDOVER REQUEST message comprises ECGIB as target cell identifier, and is to be X2-proxied by the DeNB towards the RN RNB.

As a second option (not shown), the source eNBA sends an HANDOVER REQUIRED message to the MME MMEA for further routing towards the target eNB. The HANDOVER REQUIRED message comprises DeNB-IDC and TAIB as target eNB ID and TAI respectively so as to allow the MME MMEA to appropriately route the HANDOVER REQUIRED message as an HANDOVER REQUEST message towards the DeNB DeNBC. The DeNB DeNBC then extracts the target ECGI ECGIB from the Source-eNB-to-Target-eNB-Transparent-Container IE, identifies this cell as being operated by the RN RNB, and S1-proxies that message towards the RN RNB.

Upon receipt of the HANDOVER REQUEST message, and after resource admission control, the target eNB RNB sends back a HANDOVER REQUEST ACK message to the source eNB eNBA, which message being X2/S1-proxied by the DeNB DeNBC. The HANDOVER REQUEST ACK message includes an RRC CONNECTION RECONFIGURATION container to be passed transparently by the source eNB eNBA to the UE UEX.

The UE UEX receives the RRC CONNECTION RECONFIGURATION message with necessary parameters, and is thus commanded by the source eNB eNBA to perform the handover. The UE performs synchronization to the target eNB RNB and accesses the cell B via RACH. The target eNB RNB responds with uplink allocation and timing advance value. When the UE UEX has successfully accessed the target cell B, the UE UEX sends an RRC CONNECTION RECONFIGURATION COMPLETE message to the target eNB RNB. The target eNB RNB can now begin sending data to the UE UEX.

It is to be noticed that the handover procedure for the UE UEX may fail on account of the RAN configuration data exchange, which may take some time to complete. The exchanged RAN configuration data may however be used for a further handover from the source cell A towards the target cell B for the same or another UE.

The serving eNB eNBA and the target eNB RNB are shown as connected to the same MME, yet they may be connected to different MMES, in which case the eNB CONFIGURATION TRANSFER and HANDOVER REQUIRED messages are routed by the source MME to the appropriate target MME by means of the target TAI.

Similarly, the target cell B operated by the target eNB RNB may belong to the same tracking area as the serving cell A, presently TAA. If so, the eNB eNBA would also get a copy of the MME CONFIGURATION TRANSFER message as part of the S1 paging process, and would discard this message for the very same reasons as set forth for the eNB eNBD.

Alternatively, the source eNB eNBA could also validly decide (e.g., because it is not interested in a X2 connection setup) to not issue an eNB CONFIGURATION TRANSFER message first, but rather to send an HANDOVER REQUIRED message to the MME MMEA. The following would then apply.

The source eNB eNBA decides to trigger an S1 handover including the target eNB ID and TAI, presently RN-IDB and TAIB.

The target MME does not find any eNB corresponding to the encoded target eNB ID, and the handover procedure fails with the cause 'unknown node-Id' as of today.

The source eNB eNBA acknowledges the failure and decides to further issue an eNB CONFIGURATION TRANSFER message so as to learn more about this target eNB. The procedure keeps on as aforementioned.

Although the above description has made exhaustive references to LTE technology and terminology, the radio access nodes and mobility management nodes may operate in accordance with further mobile or wireless communication technologies that are deemed to support relay nodes proxied through donor nodes. A radio access node would then refer to the network node of the Radio Access Network (RAN) infrastructure that operates the source and/or target cell for handover procedures, and that controls inbound/outbound handover decisions towards/from that cell. For instance, the source and/or target radio access node may refer to an eNB for LTE, or to a Radio Network Controller (RNC) for Universal Mobile Telecommunication System (UMTS), or to a Base Station Controller (BSC) for Global System for Mobile (GSM), etc. Similarly, the mobility management node would refer to an MME for LTE, or to a Serving GPRS Support Node (SGSN) for GSM or UMTS.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A method for transferring Radio Access Network (RAN) configuration data between radio access nodes, and comprising, by a mobility management node:
    receiving a first RAN configuration transfer message issued by a source radio access node operating a source cell, the first RAN configuration transfer message comprising a target node identifier of a target relay radio access node operating a target cell and a target tracking area identifier of said target cell, and whereby said source radio access node requests RAN configuration data from said target relay radio access node,
    decoding said target node identifier and said target tracking area identifier from said first RAN configuration transfer message,
    in the event of said target tracking area identifier being managed by said mobility management node and said target node identifier being not associated with a registered radio access node, broadcasting said first RAN configuration transfer message as a further first RAN configuration transfer message towards a plurality of registered radio access nodes associated with said target tracking area identifier, wherein the further first RAN configuration transfer message is configured for requesting from a donor radio access node Self Organizing Network configuration data in a further reply message.

2. The method according to claim 1, wherein said method further comprises, receiving from a donor radio access node out of said plurality of registered radio access nodes, and through which operation of said target relay radio access node is proxied a donor node identifier of said donor radio access node as part of a second RAN configuration transfer message, which donor node identifier is used as a target node identifier of a handover message for handing over a User Equipment from said source cell to said target cell,
    and wherein said method further comprises, by said mobility management node, forwarding said second RAN configuration transfer message as a further second RAN configuration transfer message towards said source radio access node.

3. The method according to claim 1, wherein said method further comprises, receiving from a donor radio access node out of said plurality of registered radio access nodes, and through which operation of said target relay radio access node is proxied a network address of said donor radio access node as part of a second RAN configuration transfer message, which network address is used for further connectivity between said source radio access node and said donor radio access node, and wherein said method further comprises, by said mobility management node, forwarding said second RAN configuration transfer message as a further second RAN configuration transfer message towards said source radio access node.

4. A mobility management node configured to transfer Radio Access Network (RAN) configuration data between radio access nodes, and comprising:
    a receiver that receives a first RAN configuration transfer message issued by a source radio access node operating a source cell, the RAN configuration transfer message comprising a target node identifier of a target relay radio access node operating a target cell and a target tracking area identifier of said target cell, and whereby said source radio access node requests RAN configuration data from said target relay radio access node,
    a decoder that decodes said target node identifier and said target tracking area identifier from said first RAN configuration transfer message,
    a router that, in the event of said target tracking area identifier being managed by said mobility management node and said target node identifier being not associated with any registered radio access node, broadcasts said first RAN configuration transfer message as a further first RAN configuration transfer message towards a plurality of registered radio access nodes associated with said target tracking area identifier, wherein the further first RAN configuration transfer message is configured for requesting from a donor radio access node Self Organizing Network configuration data in a further reply message.

5. The mobility management node according to claim 4, wherein said receiver further receives a second RAN configuration transfer message comprising a donor node identifier of a donor radio access node out of said plurality of registered radio access nodes, and through which operation of said target relay radio access node is proxied, which donor node identifier being used as target node identifier of a handover message for handing over a User Equipment from said source cell to said target cell,
    and wherein said router further forwards said second RAN configuration transfer message as a further second RAN configuration transfer message towards said source radio access node.

6. The mobility management node according to claim 4, wherein said receiver further receives a second RAN configuration transfer message comprising a network address of a donor radio access node out of said plurality of registered radio access nodes, and through which operation of said target relay radio access node is proxied, which network address being used for further connectivity between said source radio access node and said donor radio access node,
    and wherein said router further forwards said second RAN configuration transfer message as a further second RAN configuration transfer message towards said source radio access node.

* * * * *